United States Patent
Park et al.

(10) Patent No.: US 9,426,790 B2
(45) Date of Patent: Aug. 23, 2016

(54) METHOD AND APPARATUS FOR DELAYING TRANSMISSION OF BUFFER STATUS REPORT IN WIRELESS COMMUNICATION SYSTEM

(71) Applicant: LG ELECTRONICS INC., Seoul (KR)

(72) Inventors: Sungjun Park, Anyang-si (KR); Seungjune Yi, Anyang-si (KR); Youngdae Lee, Anyang-si (KR); Sunghoon Jung, Anyang-si (KR); Jaewook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 14/378,908

(22) PCT Filed: Jun. 20, 2013

(86) PCT No.: PCT/KR2013/005451
§ 371 (c)(1),
(2) Date: Aug. 14, 2014

(87) PCT Pub. No.: WO2014/003360
PCT Pub. Date: Jan. 3, 2014

(65) Prior Publication Data
US 2015/0358991 A1    Dec. 10, 2015

Related U.S. Application Data

(60) Provisional application No. 61/664,180, filed on Jun. 26, 2012.

(51) Int. Cl.
*H04W 72/12* (2009.01)
*H04W 72/04* (2009.01)
(Continued)

(52) U.S. Cl.
CPC ......... *H04W 72/0413* (2013.01); *H04W 24/08* (2013.01); *H04W 28/0278* (2013.01); *H04W 52/0238* (2013.01); *H04W 52/146* (2013.01); *H04W 52/365* (2013.01); *H04W 72/1215* (2013.01); *H04W 72/1242* (2013.01); *H04W 72/14* (2013.01); *H04W 76/046* (2013.01)

(58) Field of Classification Search
CPC ................................................ H04W 72/0413
See application file for complete search history.

(56) References Cited

U.S. PATENT DOCUMENTS

| | | | |
|---|---|---|---|
| 2005/0083943 A1 | 4/2005 | Lee et al. | |
| 2009/0245203 A1* | 10/2009 | Pani | H04W 36/30 370/331 |
| 2010/0098011 A1* | 4/2010 | Pelletier | H04W 72/1242 370/329 |
| 2012/0039169 A1 | 2/2012 | Susitaival et al. | |
| 2012/0039263 A1 | 2/2012 | Moberg et al. | |

(Continued)

FOREIGN PATENT DOCUMENTS

| KR | 10-2005-0020549 A | 3/2005 |
|---|---|---|
| WO | WO 2010/002337 A1 | 1/2010 |
| WO | WO 2010/043963 A1 | 4/2010 |

*Primary Examiner* — John Blanton
(74) *Attorney, Agent, or Firm* — Birch, Stewart, Kolasch & Birch, LLP

(57) ABSTRACT

A method and apparatus for delaying transmission of at least one of a buffer status report (BSR) and a power headroom report (PHR) in a wireless communication system. A user equipment (UE) triggers at least one of a BSR and a PHR, but delays transmission of the at least one of the BSR and the PHR to a base station if uplink (UL) transmission is not available. In this case, the UE may not trigger a scheduling request (SR).

12 Claims, 7 Drawing Sheets

(51) Int. Cl.
*H04W 28/02* (2009.01)
*H04W 76/04* (2009.01)
*H04W 52/02* (2009.01)
*H04W 52/14* (2009.01)
*H04W 72/14* (2009.01)
*H04W 24/08* (2009.01)
*H04W 52/36* (2009.01)

(56) References Cited

U.S. PATENT DOCUMENTS

2013/0017779 A1* 1/2013 Song .................. H04W 76/005 455/39
2013/0114583 A1* 5/2013 Park .................. H04W 52/0216 370/338

* cited by examiner

Fig. 1
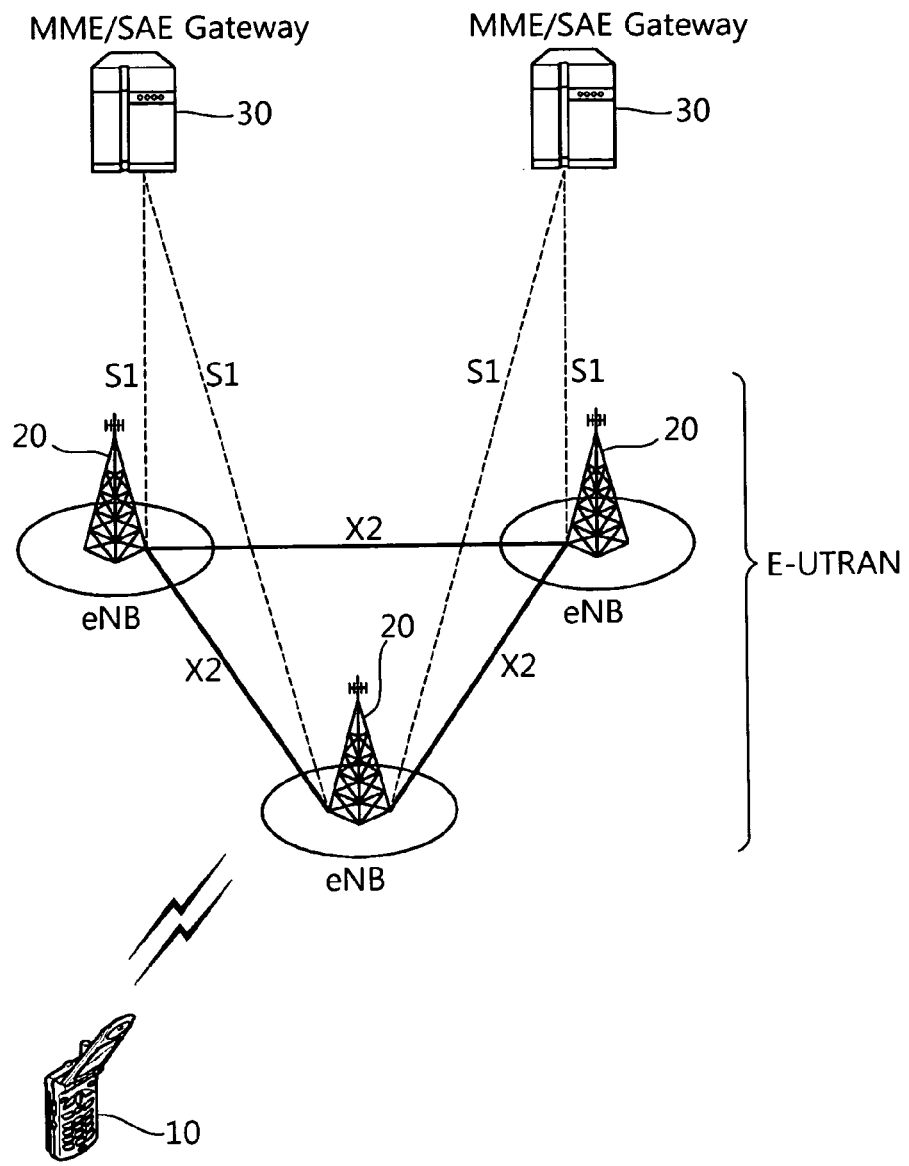
[Fig. 2]
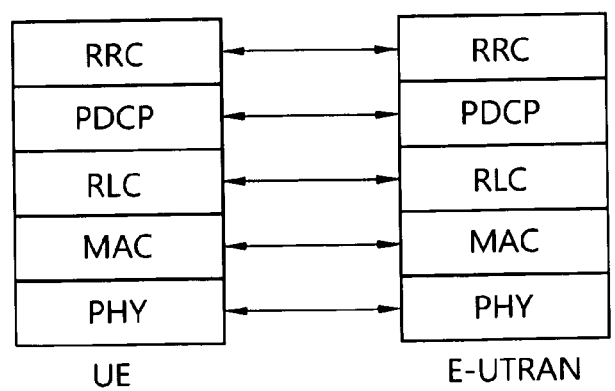

METHOD AND APPARATUS FOR DELAYING TRANSMISSION OF BUFFER STATUS REPORT IN WIRELESS COMMUNICATION SYSTEM

CROSS REFERENCE TO RELATED APPLICATIONS

This application is the National Phase of PCT/KR2013/005451 filed on Jun. 20, 2013, which claims priority under 35 U.S.C. 119(e) to U.S. Provisional Application No. 61/664,180 filed on Jun. 26, 2012, all of which are incorporated by reference herein in its entirety.

TECHNICAL FIELD

The present invention relates to wireless communications, and more particularly, to a method and apparatus for delaying transmission of a buffer status report (BSR) in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

In 3GPP LTE, a base station (BS) needs to know a type of data and an amount of data which each user wants to transmit for using uplink radio resources efficiently. For downlink radio resources, a BS can know an amount of data need to be transmitted to each user through downlink, since the data to be transmitted through the downlink is transferred from an access gateway to the BS. On the other hand, for uplink radio resources, if a user equipment (UE) does not inform a BS information on data to be transmitted through uplink, the BS cannot know how much uplink radio resources are required for each UE. Therefore, for a BS to allocate uplink radio resources to a UE properly, the UE is required to provide information for scheduling the uplink radio resources to the BS.

Accordingly, if there is data to be transmitted to a BS, a UE inform the BS that the UE has the data to be transmitted to the BS, and the BS allocates proper uplink radio resources to the UE based on the information. This procedure is called a buffer status reporting (BSR) procedure.

A UE needs uplink radio resources for transmitting a BSR to a BS. If the UE has allocated uplink radio resources when the BSR is triggered, the UE immediately transmits the BSR to the BS using the allocated uplink radio resources. If the UE does not have allocated uplink radio resources when the BSR is triggered, the UE performs a scheduling request (SR) procedure for receiving uplink radio resources from the BS.

Transmit power needs to be properly regulated in order for a user equipment (UE) to transmit data to a base station (BS). When the transmit power is too low, the BS may not be able to correctly receive the data. When the transmit power is too high, even though the UE can receive data without any problem, it may act as an interference to another UE for receiving data. Therefore, the BS needs to optimize power used in uplink transmission of the UE from a system aspect.

In order for the BS to regulate the transmit power of the UE, essential information must be acquired from the UE. For this, power headroom reporting (PHR) of the UE is used. A power headroom implies power that can be further used in addition to the transmit power currently used by the UE. That is, the power headroom indicates a difference between maximum possible transmit power that can be used by the UE and the currently used transmit power. Upon receiving the PHR from the UE, the BS can determine transmit power used for uplink transmission of the UE at a next time on the basis of the received PHR. The determined transmit power of the UE can be indicated by using a size of a resource block (RB) and a modulation and coding scheme (MCS), and can be used when an uplink (UL) grant is allocated to the UE at a next time. Since radio resources may be wasted if the UE frequently transmits the PHR, the UE can define a PHR trigger condition and transmit the PHR only when the condition is satisfied.

In order to allow users to access various networks and services ubiquitously, an increasing number of UEs are equipped with multiple radio transceivers. For example, a UE may be equipped with 3GPP LTE, Wi-Fi, and Bluetooth transceivers, and global navigation satellite system (GNSS) receivers. Due to extreme proximity of multiple radio transceivers within the same UE operating on adjacent frequencies or subharmonic frequencies, the interference power coming from a transmitter of the collocated radio may be much higher than the actual received power level of the desired signal for a receiver. This situation causes in-device coexistence (IDC) interference. The challenge lies in avoiding or minimizing IDC interference between those collocated radio transceivers, as current state-of-the-art filter technology might not provide sufficient rejection for certain scenarios.

When a UE experiences a level of IDC interference that cannot be solved by the UE itself and a network intervention is required, the UE transmits an DC indication via dedicated radio resource (RRC) signaling to report the problems. The details of the IDC indication trigger may be left up to UE implementation. It may rely on existing LTE measurements and/or UE internal coordination. The IDC indication should be triggered based on ongoing IDC interference on the serving or non-serving frequencies, instead of assumptions or predictions of potential interference. A UE that supports IDC functionality indicates this capability to the network, and the network can then configure by dedicated signaling whether the UE is allowed to transmit an IDC indication. The UE may only transmit an IDC indication for E-UTRA UL/DL carriers for which a measurement object is configured.

The term "ongoing IDC interference" should be treated as a general guideline by the UE. For the serving frequency, ongoing interference consists of interference caused by aggressor radio to victim radio during either active data exchange or upcoming data activity which is expected in up to a few hundred milliseconds. For the non-serving frequency, ongoing interference is an anticipation that the LTE radio will either become aggressor or victim if it is handed over to the non-serving frequency. Ongoing interference is applicable over several subframes/slots where not necessarily all the subframes/slots are affected.

When notified of IDC problems through an IDC indication from the UE, a BS can choose to apply a frequency division multiplexing (FDM) solution or a time division multiplexing (TDM) solution:

The basic concept of an FDM solution is to move the LTE signal away from an industrial, scientific and medical (ISM) band by performing inter-frequency handover within E-UTRAN.

The basic concept of a TDM solution is to ensure that transmission of a radio signal does not coincide with reception of another radio signal. LTE discontinuous reception (DRX) mechanism is considered as a baseline to provide TDM patterns (i.e. periods during which the LTE UE may be scheduled or is not scheduled) to resolve the IDC issues. DRX based TDM solution should be used in a predictable way, i.e. the BS should ensure a predictable pattern of unscheduled periods by means of DRX mechanism.

To assist the BS in selecting an appropriate solution, all necessary/available assistance information for both FDM and TDM solutions is transmitted together in the IDC indication to the BS. The IDC assistance information contains the list of E-UTRA carriers suffering from ongoing interference and, depending on the scenario, it also contains TDM patterns or parameters to enable appropriate DRX configuration for TDM solutions on the serving E-UTRA carrier. The IDC indication is also used to update the IDC assistance information, including for the cases when the UE no longer suffers from IDC interference. A prohibit mechanism is used to restrict the interval at which the UE transmits the IDC indication. In case of inter-eNB handover, the DC assistance information is transferred from the source BS to the target BS.

From the start of IDC interference detection to the delivery of the corresponding IDC indication to the network, it is up to the UE whether radio resource management (RRM) measurements reflect IDC interference. After the successful transmission of the IDC indication though, the UE shall ensure that RRM measurements are free of IDC interference.

In addition, the UE can autonomously deny LTE transmission to protect ISM in rare cases if other solutions cannot be used. Conversely, it is assumed that the UE also autonomously denies ISM transmission in order to ensure connectivity with the eNB to perform necessary procedures to resolve IDC problems. The use of autonomous denials is not limited to handover scenarios. There could be a limit on the amount of denials known to both UE and eNB.

As describe above, if a UE has some data to transmit, the UE may transmit a BSR to a BS. Based on the information from the received BSR, the BS may allocate UL grants to the UE. Then, the UE can transmit the data by using the allocated UL grants.

However, if the UE needs to deny the UL grants to protect the ISM transmissions, the allocated UL grants will be just wasted because they cannot be used by the other UEs.

Therefore, it is important to minimize the impact of the autonomous denials that results in waste of the UL resources.

SUMMARY OF INVENTION

Technical Problem

The present invention provides a method and apparatus for delaying transmission of a buffer status report (BSR) in a wireless communication system. The present invention provides a method for delaying transmission of at least one of BSR and a power headroom report (PHR) when a user equipment (UE) cannot perform uplink (UL) transmission.

Solution to Problem

In an aspect, a method for delaying, by a user equipment (UE), transmission of at least one of a buffer status report (BSR) and a power headroom report (PHR) in a wireless communication system is provided. The method includes triggering at least one of a BSR and a PHR, and delaying transmission of the at least one of the BSR and the PHR to a base station if uplink (UL) transmission is not available.

The delaying transmission of the at least one of the BSR and the PHR may include not triggering a scheduling request (SR).

The method may further include triggering an SR when the UL transmission becomes available, receiving uplink radio resources allocated for transmission of the delayed at least one of the BSR and the PHR from the base station, and transmitting the delayed at least one of the BSR and the PHR to the base station using the uplink radio resources.

The UL transmission may be not available when in-device coexistence (IDC) problem within the UE occurs.

The method may further include receiving an SR configuration from the base station.

In another aspect, a user equipment (UE) in a wireless communication system is provided. The UE includes a radio frequency (RF) unit for transmitting or receiving a radio signal, and a processor coupled to the RF unit and configured for triggering at least one of a BSR and a PHR, and delaying transmission of the at least one of the BSR and the PHR to a base station if uplink (UL) transmission is not available.

Advantageous Effects of Invention

In-device coexistence (IDC) interference within a UE due to UL transmission can be prevented.

BRIEF DESCRIPTION OF DRAWINGS

FIG. 1 shows a structure of a wireless communication system.

FIG. 2 is a diagram showing a radio interface protocol architecture for a control plane.

MODE FOR THE INVENTION

Figure 3:
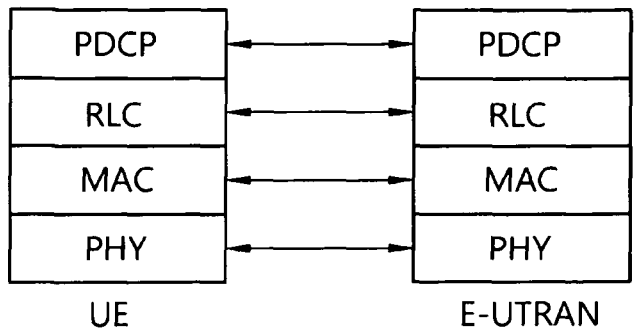
FIG. 3 is a diagram showing a radio interface protocol architecture for a user plane.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 may be generally a fixed station that communicates with the UE 10 and may be referred to as another terminology, such as an evolved node-B (eNB), a base transceiver system (BTS), an access point, etc. There may be one or more cells within the coverage of the BS 20. A single cell may be configured to have one of bandwidths selected from 1.25, 2.5, 5, 10, and 20 MHz, etc., and may provide downlink or uplink transmission services to several UEs. In this case, different cells may be configured to provide different bandwidths.

Interfaces for transmitting user traffic or control traffic may be used between the BSs 20. The UE 10 and the BS 20 may be connected by means of a Uu interface. The BSs 20 may be interconnected by means of an X2 interface. The BSs 20 may be connected to an evolved packet core (EPC) by means of an S1 interface. The EPC may consist of a mobility management entity (MME), a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The MME is in charge of functionality of a control plane. The S-GW is in charge of functionality of a user plane. The BSs 20 may be connected to the MME 30 by means of an S1-MME interface, and may be connected to the S-GW by means of an S1-U interface. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN are classified into a first layer (L1), a second layer (L2), and a third layer (L3) based on the lower three layers of the open system interconnection (OS1) model that is well-known in the communication system. The radio interface protocol between the UE and the E-UTRAN may be horizontally divided into a physical layer, a data link layer, and a network layer, and may be vertically divided into a control plane which is a protocol stack for control signal transmission and a user plane which is a protocol stack for data information transmission. The layers of the radio interface protocol may exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data may be transferred between the MAC layer and the PHY layer through the transport channel. The transport channel may be classified according to how and with what characteristics data is transmitted through a radio interface. Or, the transport channel may be classified into a dedicated transport channel and a common transport channel depending on whether or not to share the transport channel. Between different PHY layers, i.e., a PHY layer of a transmitter and a PHY layer of a receiver, data may be transferred through the physical channel. The physical channel may be modulated using an orthogonal frequency division multiplexing (OFDM) scheme, and utilizes time and frequency as a radio resource.

Figure 4:
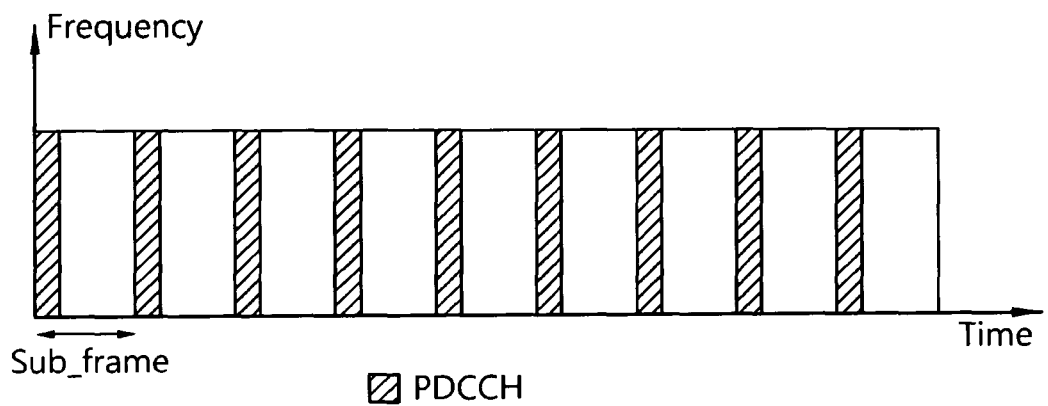
FIG. 4 shows an example of a physical channel structure.

FIG. 4 shows an example of a physical channel structure.

A physical channel may consist of a plurality of subframes in a time domain and a plurality of subcarriers in a frequency domain. One subframe may consist of a plurality of symbols in the time domain. One subframe may consist of a plurality of resource blocks (RBs). One RB may consist of a plurality of symbols and a plurality of subcarriers. In addition, each subframe may use specific subcarriers of specific symbols of a corresponding subframe for a physical downlink control channel (PDCCH). For example, a first symbol of the subframe may be used for the PDCCH. A transmission time interval (TTI) which is a unit time for data transmission may be equal to a length of one subframe.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel may be divided into a control channel for delivering information of the control plane and a traffic channel for delivering information of the user plane.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A buffer status reporting (BSR) is described below. It may be referred to Section 5.4.5 of 3GPP TS 36.321 V 10.5.0 (2012-03).

A BSR procedure is used to provide a serving eNB with information about an amount of data available for transmission in UL buffers of a UE. An RRC may control the BSR reporting by configuring two timers periodicBSR-Timer and retxBSR-Timer and by, for each logical channel, optionally signalling logicalChannelGroup which allocates the logical channel to a logical channel group (LCG).

For the BSR procedure, the UE may consider all radio bearers which are not suspended and may consider radio bearers which are suspended.

Buffer status report (BSR) MAC control element (CE)s may consist of either:
  short BSR and truncated BSR format: one LCG ID field and one corresponding buffer size field; or
  long BSR format: four buffer size fields, corresponding to LCG IDs #0 through #3.

The BSR formats may be identified by MAC PDU subheaders with LCIDs.

Figure 5:
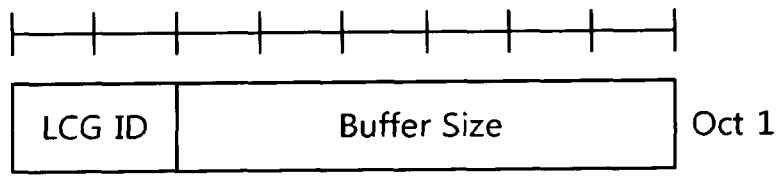
FIG. 5 shows a short BSR and truncated BSR MAC CE.
Figure 6:
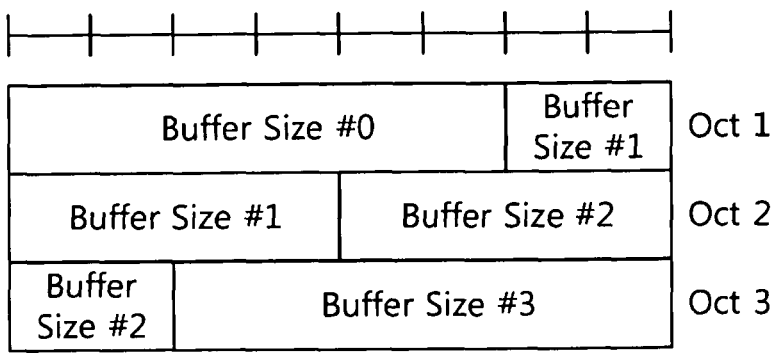
FIG. 6 shows a long BSR MAC CE.

FIG. 5 shows a short BSR and truncated BSR MAC CE. FIG. 6 shows a long BSR MAC CE.

The LCG ID field and the buffer size field may be defined as follow:
  LCG ID: The LCG ID field identifies a group of logical channel(s) which buffer status is being reported. The length of the field is 2 bits;
  Buffer size: The buffer size field identifies total amount of data available across all logical channels of a logical channel group after all MAC PDUs for the TTI have been built. The amount of data is indicated in number of bytes. It may include all data that is available for transmission in an RLC layer and in a PDCP layer. A size of RLC and MAC headers are not considered in the buffer size computation. The length of this field is 6 bits. If extendedBSR-Sizes is not configured, the values taken by the buffer size field are shown in Table 1. If extendedBSR-Sizes is configured, the values taken by the buffer size field are shown in Table 2.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

TABLE 2

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

Table 1 and Table 2 show buffer size levels for a BSR. Table 1 and Table 2 show a size of a buffer in which data of a LCG, which is available for transmission and is indicated from an RLC layer and a PDCP layer to a MAC layer, is stored. The size of the buffer is indicated by indexed levels. Referring to Table 1, a size of buffer in which data of one LCG, which is available for transmission, is stored is indicated from 0 to 150 kB and up to more than 150 kB (corresponding to index 63).

The BSR procedure may be triggered if any of the following events occur:

UL data, for a logical channel which belongs to a LCG, becomes available for transmission in an RLC entity or in an PDCP entity (to be described below), and either the data belongs to a logical channel with higher priority than priorities of logical channels which belong to any LCG and for which data is already available for transmission, or there is no data available for transmission for any of logical channels which belong to a LCG, in which case the BSR is referred below to as "regular BSR";

UL resources are allocated and number of padding bits is equal to or larger than a size of a buffer status report MAC control element (CE) plus its subheader, in which case the BSR is referred below to as "padding BSR";

retxBSR-Timer expires and the UE has data available for transmission for any of logical channels which belong to a LCG, in which case the BSR is referred below to as "regular BSR";

periodicBSR-Timer expires, in which case the BSR is referred below to as "periodic BSR".

For the regular BSR and the periodic BSR:
if more than one LCG has data available for transmission in the TTI where the BSR is transmitted: report a long BSR;
else report a short BSR.

For the padding BSR:
if the number of padding bits is equal to or larger than a size of a short BSR plus its subheader but smaller than a size of a long BSR plus its subheader:
if more than one LCG has data available for transmission in the TTI where the BSR is transmitted: report a truncated BSR of the LCG with the highest priority logical channel with data available for transmission;
else report a short BSR.
else if the number of padding bits is equal to or larger than a size of a long BSR plus its subheader, report a long BSR.

If the BSR procedure determines that at least one BSR has been triggered and not cancelled:
if the UE has UL resources allocated for new transmission for this TTI:
instruct multiplexing and assembly procedure to generate the BSR MAC CE(s);
start or restart periodicBSR-Timer except when all the generated BSRs are truncated BSRs;
start or restart retxBSR-Timer.
else if a regular BSR has been triggered:
if an uplink grant is not configured or the regular BSR was not triggered due to data becoming available for transmission for a logical channel for which logical channel SR masking (logicalChannelSR-Mask) is setup by upper layers:
a scheduling request shall be triggered.

A MAC PDU may contain at most one MAC BSR CE, even when multiple events trigger a BSR by the time a BSR can be transmitted in which case the regular BSR and the periodic BSR shall have precedence over the padding BSR.

The UE may restart retxBSR-Timer upon indication of a grant for transmission of new data on any UL-SCH.

All triggered BSRs may be cancelled in case the UL grant(s) in this subframe can accommodate all pending data available for transmission but is not sufficient to additionally accommodate the BSR MAC CE plus its subheader. All triggered BSRs may be cancelled when a BSR is included in a MAC PDU for transmission.

The UE may transmit at most one regular/periodic BSR in a TTI. If the UE is requested to transmit multiple MAC PDUs in a TTI, it may include a padding BSR in any of the MAC PDUs which do not contain a regular/periodic BSR.

All BSRs transmitted in a TTI may always reflect a buffer status after all MAC PDUs have been built for this TTI. Each LCG may report at the most one buffer status value per TTI and this value may be reported in all BSRs reporting buffer status for this LCG.

Data available for transmission is described below.

Data available for transmission in an RLC layer is described. It may be referred to Section 4.5 of 3GPP TS 36.322 V10.0.0 (2010-12).

For the purpose of MAC BSR procedure, the UE may consider the following as data available for transmission in the RLC layer:

RLC SDUs, or segments thereof, that have not yet been included in an RLC data PDU;

RLC data PDUs, or portions thereof, that are pending for retransmission (RLC AM).

In addition, if a STATUS PDU has been triggered and a status prohibit timer is not running or has expired, the UE may estimate a size of the STATUS PDU that will be transmitted in the next transmission opportunity, and consider this as data available for transmission in the RLC layer.

Data available for transmission in a PDCP layer is described. It may be referred to Section 4.5 of 3GPP TS 36.323 V 10.0.0 (2010-12).

For the purpose of MAC BSR procedure, the UE may consider PDCP control PDUs, as well as the following as data available for transmission in the PDCP layer:

For SDUs for which no PDU has been submitted to lower layers:

the SDU itself, if the SDU has not yet been processed by PDCP, or the PDU if the SDU has been processed by PDCP.

In addition, for radio bearers that are mapped on RLC AM, if the PDCP entity has previously performed a re-establishment procedure, the UE may also consider the following as data available for transmission in the PDCP layer:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by a PDCP status report, if received:

the SDU, if it has not yet been processed by PDCP, or the PDU once it has been processed by PDCP.

A scheduling request (SR) is described below. It may be referred to Section 5.4.4 of 3GPP TS 36.321 V 10.5.0 (2012-03).

An SR is used for requesting UL-SCH resources for new transmission.

When an SR is triggered, it may be considered as pending until it is cancelled. All pending SR(s) may be cancelled and sr-ProhibitTimer may be stopped when a MAC PDU is assembled and this PDU includes a BSR which contains buffer status up to (and including) the last event that triggered a BSR, or when the UL grant(s) can accommodate all pending data available for transmission.

If an SR is triggered and there is no other SR pending, the UE may set the SR_COUNTER to 0.

As long as one SR is pending, the UE shall for each TTI:
if no UL-SCH resources are available for a transmission in this TTI:
if the UE has no valid PUCCH resource for SR configured in any TTI: initiate a random access procedure and cancel all pending SRs;
else if the UE has a valid PUCCH resource for SR configured for this TTI and if this TTI is not part of a measurement gap and if sr-ProhibitTimer is not running:
if SR_COUNTER<dsr-TransMax:
increment SR_COUNTER by 1;
instruct a physical layer to signal the SR on PUCCH;
start the sr-ProhibitTimer.
else:
notify RRC to release PUCCH/SRS;
clear any configured downlink assignments and uplink grants;
initiate a random access procedure and cancel all pending SRs.

That is, an SR may be performed in two ways, which includes a method using a dedicated scheduling request (D-SR) channel set on a PUCCH resource and a method using a random access procedure. When a BSR is triggered, the UE triggers an SR for transmitting the BSR. In addition, if a D-SR channel is allocated when the SR is triggered, the UE transmits a radio resource allocation request using the D-SR channel. If the D-SR channel is not allocated when the SR is triggered, the UE starts a random access procedure.

Figure 7:
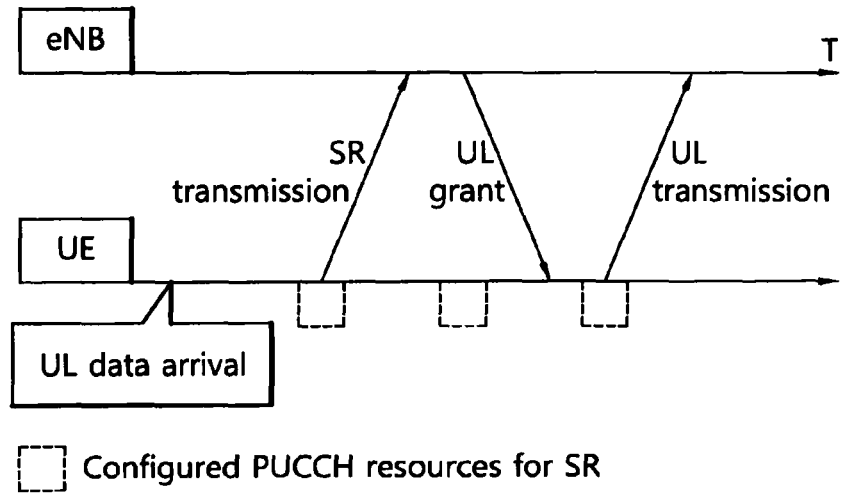
FIG. 7 shows an example of an SR procedure.

FIG. 7 shows an example of an SR procedure.

Referring to FIG. 7, a method for performing an SR procedure through a D-SR channel is described. A BS allocates D-SR channels, having regular intervals, to a UE. If UL data arrives, the UE triggers a BSR. If the UE does not have allocated radio resources, the UE triggers an SR. After, the UE performs an SR procedure through the D-SR channels. Upon receiving the SR from the UE, the BS determines resource distribution and informs the UE allocated uplink radio resources to the UE through a PDCCH according to a scheduling algorithm. If the D-SR channels are not allocated to the UE, the UE performs an SR procedure through a random access procedure.

A random access procedure is described.

The UE can perform a random access procedure in the following cases.

When the UE performs an initial access to the BS in a situation where there is no RRC connection with the BS.

When the UE initially accesses to a target cell in a handover procedure.

When it is requested by a command of the BS.

When data to be transmitted in an uplink is generated in a situation where uplink time misalignment occurs or a designated radio resource used to request a radio resource is not allocated.

When a recovery process is performed at the occurrence of a radio link failure or a handover failure.

In an LTE system, a non-contention based random access procedure allocating, by a BS, a designated (or dedicated) random access preamble to a particular UE and randomly accessing, by the UE, with the random access preamble is provided. In other words, the procedure of selecting a random access preamble includes a contention based random access procedure that a UE randomly selects one random access preamble from a particular set and uses the same and a non-contention based random access procedure that a UE uses a random access preamble allocated thereto. A difference between the two random access procedures lies in a generation of collision due to contention as described hereinafter. The non-contention based random access procedure may be used only when the foregoing handover process is performed or when it is requested by a command from a BS.

Figure 8:
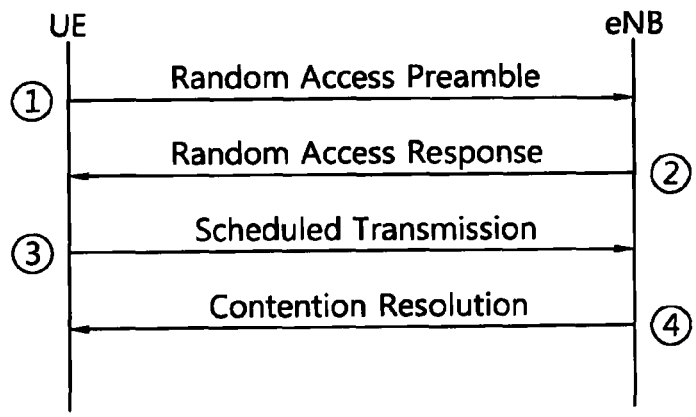
FIG. 8 shows an example of an operation process of a UE and a base station in a contention-based random access procedure.

FIG. 8 shows an example of an operation process of a UE and a base station in a contention-based random access procedure.

1. In the contention based random access, a UE randomly selects one random access from a set of random access preambles indicated by system information or a handover command, selects a PRACH resource able to transmit the random access preamble, and transmits the same.

2. After the random access preamble is transmitted, the UE attempts to receive a random access response thereof within a random access response reception window indicated by the system information or the handover command. In detail, the random access response information is transmitted in the form of a MAC PDU, and the MAC PDU is transferred on a PDSCH. In order to allow the UE to properly receive the information transmitted on the PDSCH, a PDCCH is also transferred together. Namely, the PDCCH includes information regarding a UE which is to receive the PDSCH, frequency and time information of radio resource of the PDSCH, a transmission format of the PDSCH, and the like. When the UE successfully receives the PDCCH destined therefor, the UE appropriately receives the random access response transmitted on the PDSCH according to the information items of the PDCCH. The random access response includes a random access preamble identifier (ID), a UL grant (uplink radio resource), a temporary C-RNTI, and a time alignment command (TAC). In the above, the reason why the random access preamble identifier is required is because, since a single random access response may include random access response information for one or more UEs, so the random access preamble identifier informs for which UE the UL grant, temporary C-RNTI, and TAC are valid. The random access preamble identifier is identical to a random access preamble selected by the UE in 1.

3. When the UE receives the random access response valid therefor, the UE processes the information items included in the random access response. Namely, the UE applies the TAC and stores the temporary C-RNTI. Also, the UE transmits data stored in a buffer thereof or newly generated data to the BS by using the UL grant. In this case, an identifier of the UE should be included in the data included in the UL grant. The reason is because, in the contention based random access procedure, the BS cannot determine which UEs perform the random access procedure, so in order to resolve collision later, the BS should identify UEs. Also, there are two types of methods for including an identifier of the UE. A first method is that when the UE has a valid cell identifier already allocated in the corresponding cell before the random access procedure, the UE transmits its cell identifier through the UL grant. Meanwhile, when the UE has not been allocated a valid cell identifier before the random access procedure, the UE includes its unique identifier (e.g., an S-TMSI or a random ID) in data and transmits the same. In general, the unique identifier is longer than a cell identifier. When the UE transmits the data through the UL grant, the UE starts a contention resolution timer.

4. After the UE transmits the data including its identifier through the UL grant included in the random access response, the UE waits for an instruction from the BS for a collision resolution. Namely, in order to receive a particular message, the UE attempts to receive a PDCCH. There are two methods for receiving a PDCCH. As mentioned above, when the identifier of the UE transmitted through the UL grant is a cell identifier, the UE attempts to receive a PDCCH by using its cell identifier, and when the identifier is a unique identifier, the UE attempts to receive a PDCCH by using the temporary C-RNTI included in the random access response. Thereafter, in the former case, when a PDCCH is received through its cell identifier before the contention resolution timer expires, the UE determines that the random access procedure has been normally performed, and terminates the random access procedure. In the latter case, when the UE receives a PDCCH through the temporary cell identifier before the contention resolution time expires, the UE checks data transferred by the PDSCH indicated by the PDCCH. When the data content includes its unique identifier, the UE determines that the random access procedure has been normally performed, and terminates the random access procedure.

Figure 9:
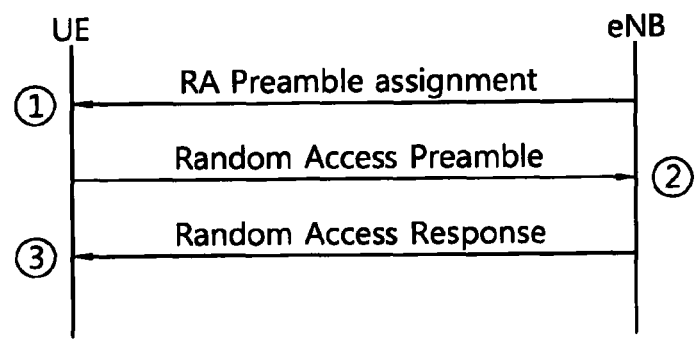
FIG. 9 shows an example of an operation process of a UE and that a base station in a non-contention based random access procedure.

FIG. 9 shows an example of an operation process of a UE and that a base station in a non-contention based random access procedure. Additionally, in comparison to the contention based random access procedure, in the non-contention based random access procedure, upon receiving random access response information, it is determined that a random access procedure has been normally performed, and the random access procedure is terminated.

1. As mentioned above, the non-contention based random access procedure may exist, first, in the case of a handover process, and second, in the case of being requested by a command from a BS. Of course, in the two cases, the contention based random access procedure may be performed. First, for the non-contention based random access procedure, it is important to receive a designated random access preamble eliminating a possibility of collision. A method of receiving an indication of the random access preamble includes a handover command and a PDCCH command.

2. After receiving the allocated random access preamble designated only for the UE, the UE transmits the preamble to the BS.

3. A method of receiving random access response information is the same as that in the contention-based random access procedure.

A power headroom reporting (PHR) procedure of a user equipment is described. It may be referred to Section 5.4.6 of 3GPP TS 36.321 V8.12.0 (2012-03).

The PHR procedure is used to provide the serving eNB with information about the difference between the nominal UE maximum transmit power and the estimated power for uplink shared channel (UL-SCH) transmission. The RRC controls the PHR by configuring the two timers periodicPHR-Timer and prohibitPHR-Timer, and by signalling dl-PathlossChange which sets the change in measured downlink pathloss to trigger a PHR.

The PHR may be triggered if any of the following events occur:

prohibitPHR-Timer expires or has expired and the path loss has changed more than dl-PathlossChange dB since the transmission of a PHR when UE has UL resources for new transmission;

periodicPHR-Timer expires;

upon configuration or reconfiguration of the power headroom reporting functionality by upper layers, which is not used to disable the function.

If the UE has UL resources allocated for new transmission for this TTI:

if it is the first UL resource allocated for a new transmission since the last MAC reset, start periodicPHR-Timer;

if the PHR procedure determines that at least one PHR has been triggered since the last transmission of a PHR or this is the first time that a PHR is triggered, and;

if the allocated UL resources can accommodate a PHR MAC control element plus its subheader as a result of logical channel prioritization:
  obtain the value of the power headroom from the physical layer;
  instruct the multiplexing and assembly procedure to generate and transmit a PHR MAC control element based on the value reported by the physical layer;
  start or restart periodicPHR-Timer;
  start or restart prohibitPHR-Timer;
  cancel all triggered PHR(s).

Figure 10:
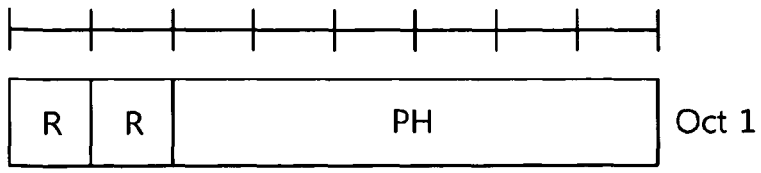
FIG. 10 shows an example of a PHR MAC CE.

FIG. 10 shows an example of a PHR MAC CE.

The UE may transmit the PHR through the PHR MAC CE to the BS. The PHR MAC CE is identified by a MAC PDU subheader with LCID. The LCID may be allocated for the PHR MAC CE in the UL-SCH, and a value of the LCID may be 11010. It has a fixed size and consists of a single octet defined as follows:
  R: reserved bit, set to "0";
  Power headroom (PH): this field indicates the power headroom level. The length of the field is 6 bits, so total 64 power headroom levels may be indicated. Table 3 shows the reported PH and the corresponding power headroom levels.

TABLE 3

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

A logical channel prioritization (LCP) is described. It may be referred to Section 5.4.3.1 of 3GPP TS 36.321 V 10.5.0 (2012-03).

The LCP procedure is applied when a new transmission is performed.

The RRC controls the scheduling of uplink data by signalling for each logical channel: priority where an increasing priority value indicates a lower priority level, prioritisedBitRate which sets the prioritized bit rate (PBR), and bucketSizeDuration which sets the bucket size duration (BSD).

The UE shall maintain a variable Bj for each logical channel j. Bj shall be initialized to zero when the related logical channel is established, and incremented by the product PBR×TTI duration for each TTI, where PBR is prioritized bit rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following LCP procedure when a new transmission is performed. The UE shall allocate resources to the logical channels in the following steps:
  Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);
  Step 2: The UE shall decrement Bj by the total size of MAC SDUs served to logical channel j in Step 1. The value of Bj can be negative.
  Step 3: If any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:
  the UE should not segment an RLC SDU (or partially transmitted SDU or retransmitted RLC PDU) if the whole SDU (or partially transmitted SDU or retransmitted RLC PDU) fits into the remaining resources;
  if the UE segments an RLC SDU from the logical channel, it shall maximize the size of the segment to fill the grant as much as possible;
  the UE should maximize the transmission of data.
  if the UE is given an UL grant size that is equal to or larger than 4 bytes while having data available for transmission, the UE shall not transmit only padding BSR and/or padding (unless the UL grant size is less than 7 bytes and an AMD PDU segment needs to be transmitted).

The UE shall not transmit data for a logical channel corresponding to a radio bearer that is suspended.

For the LCP procedure, the UE shall take into account the following relative priority in decreasing order:
  MAC control element for C-RNTI or data from UL-CCCH;
  MAC control element for BSR, with exception of BSR included for padding;
  MAC control element for PHR;
  data from any Logical Channel, except data from UL-CCCH;
  MAC control element for BSR included for padding.

In-device coexistence (IDC) interference will be described.

Figure 11:
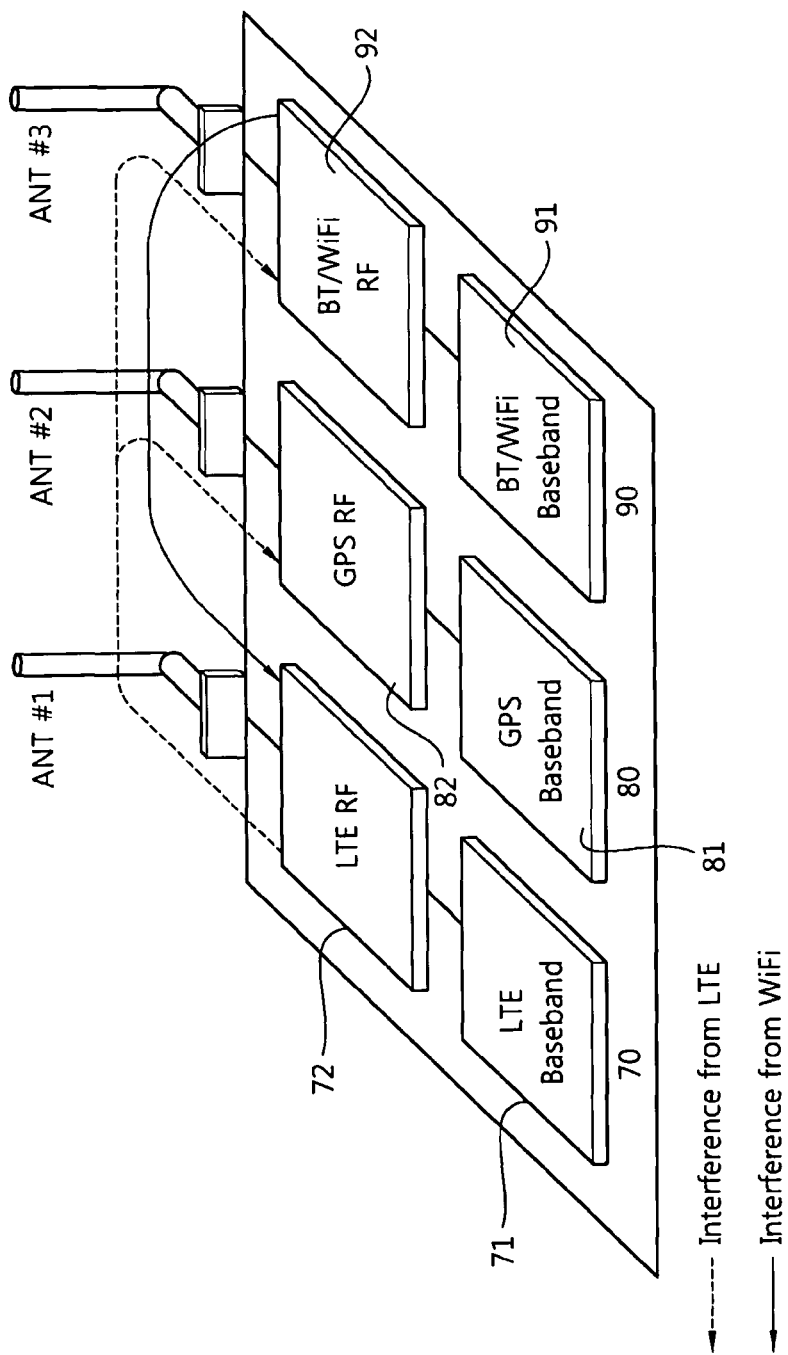
FIG. 11 shows an example of coexistence interference within the same UE.

FIG. 11 shows an example of coexistence interference within the same UE.

A LTE module 70 includes a LTE baseband 71 and a LTE radio frequency (RF) 72. A GPS module 80 includes a GPS baseband 81 and a GPS RF 82. A Bluetooth/Wi-Fi module 90 includes a Bluetooth/Wi-Fi baseband 91 and a Bluetooth/Wi-Fi RF 92.

Different radio access technologies (RATs) within the same UE operating on adjacent frequencies cause interference to each other. For example, if all of the LTE module 70, the GPS module 80 and the Bluetooth/Wi-Fi module 90 are switched on, the LTE module 70 may interfere the GPS module 80 and the Bluetooth/Wi-Fi module 90. Or the Bluetooth/Wi-Fi module 90 may interfere the LTE module 70. The LTE module 70 can measure the IDC interference by cooperating with other radio modules or by inter/intra frequency measurements.

Coexistence scenarios are due to adjacent frequencies between different radio technologies. To describe coexistence interference scenarios between LTE radio and other radio technologies, 3GPP frequency bands around 2.4 GHz industrial, scientific and medical (ISM) bands are considered.

Figure 12:
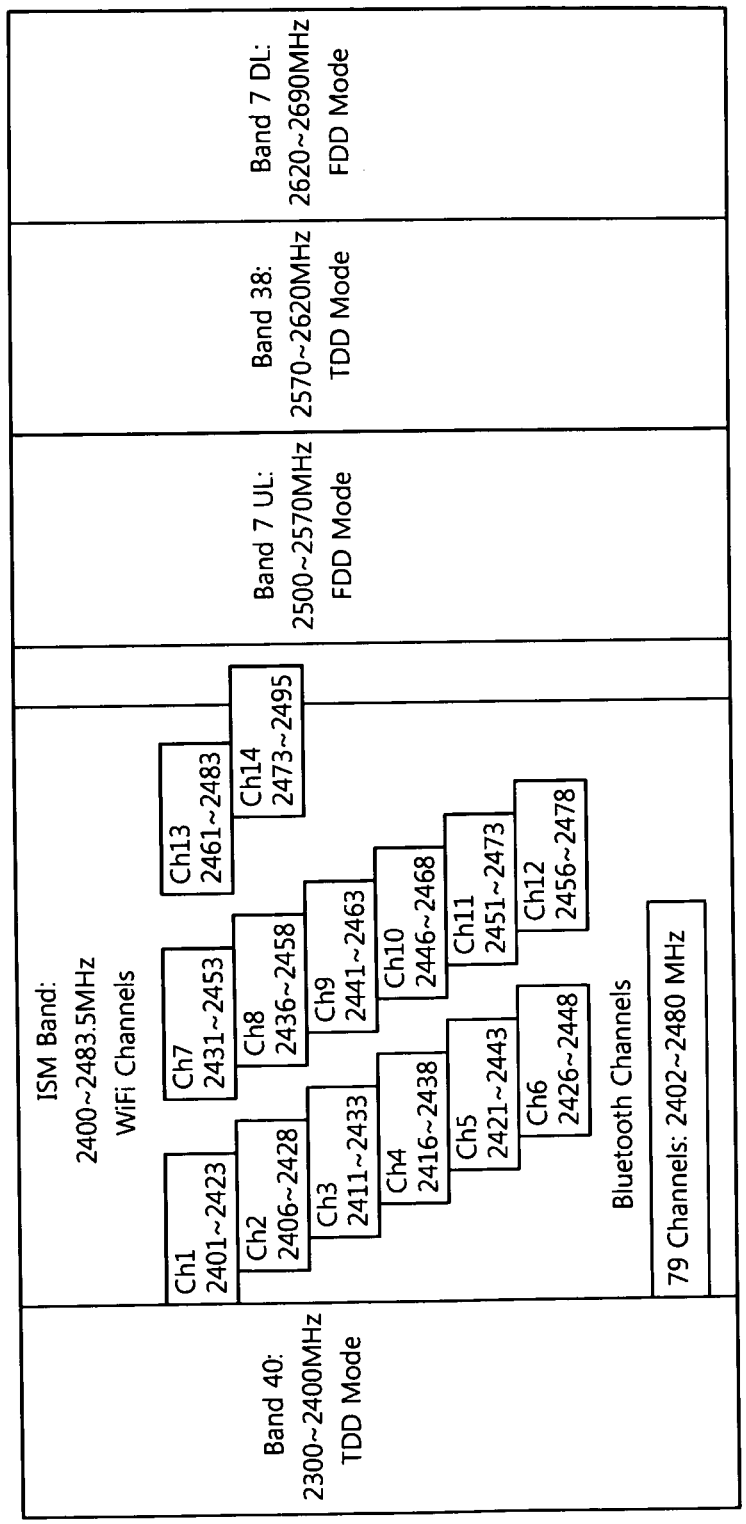
FIG. 12 shows 3GPP frequency bands around ISM band.

FIG. 12 shows 3GPP frequency bands around ISM band.

There are 14 channels demarcated in ISM band for Wi-Fi operation. Each channel has 5 MHz separation from other channel with an exception of channel number 14 where separation is 12 MHz. Channel 1 starts with 2401 MHz and channel 14 ends at 2495 MHz. Different countries have different policies for number of allowed channels of Wi-Fi. The transmitter of LTE band 40 may affect receiver of Wi-Fi and vice-versa. Since band 7 is a FDD band, so there is no impact on the LTE receiver from the Wi-Fi transmitter. But the Wi-Fi receiver will be affected by the LTE uplink transmitter.

Bluetooth operates in 79 channels of 1 MHz each in ISM band. The first channel starts with 2402 MHz and the last channel ends at 2480 MHz. Similar as Wi-Fi case, the activities of LTE band 40 and Bluetooth may disturb each other, and the transmission of LTE band 7 UL may affect Bluetooth reception as well.

The transmitter of LTE band 7/13/14 may cause interference to the receiver of GNSS at 1575.42 MHz.

As described above, a UE triggers a BSR according to BSR trigger conditions. If the UE does not have allocated uplink radio resources, the UE triggers an SR and performs an SR procedure. The UE transmit the BSR to a BS through allocated uplink radio resources by the SR. The BS allocates additional radio resources to the UE through the received BSR. The UE performs uplink transmission through the additional radio resources.

However, in a situation that IDC interference can occur within a UE due to UL transmission of the UE, if a BSR is triggered, the IDC interference within the UE may occur continuously. More specifically, UL transmissions through a D-SR channel when the UE performs an SR procedure, UL transmissions when the UE transmits the BSR through allocated radio resources by the SR procedure, and UL transmissions through additional allocated radio resources by the BSR may cause the IDC interference within the UE continuously.

Accordingly, a method for delaying transmission of at least one of BSR/PHR when UL transmissions are not available may be proposed according to embodiment of the present invention. The UL transmissions may be not available due to IDC interference within a UE.

According to an embodiment of the present invention, when a UE needs to report the BSR/PHR (i.e., when BSR/PHR is triggered), the UE checks whether the IDC interference happens. If the IDC interference occurs, the UE delays BSR/PHR transmissions until the IDC interference disappears. For example, the triggered BSR does not trigger an SR while the UE is experiencing the IDC interference even if the UE does not have allocated radio resources. When there is the triggered BSR/PHR and the IDC interference disappears, the UE is allowed to transmit the BSR/PHR. For example, the SR may be triggered due to the triggered BSR. The UE may transmit the delayed BSR/PHR after the SR is triggered.

Or, according to an embodiment of the present invention, the UE may not trigger the BSR/PHR when UL transmissions are not available. The UE may not trigger the BSR/PHR until the IDC interference disappears. When the IDC interference disappears, the UE may trigger the BSR/PHR, and transmit the delayed BSR/PHR.

Figure 13:
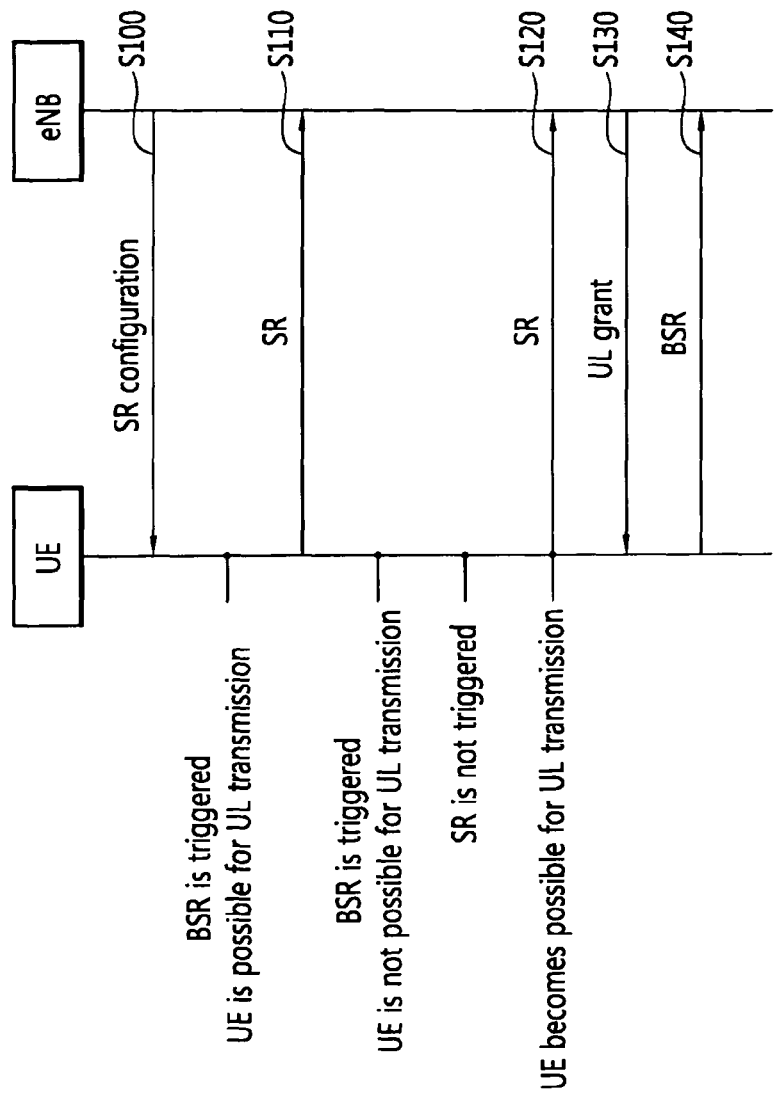
FIG. 13 shows an example of a method for delaying transmission of a BSR according to an embodiment of the present invention.

FIG. 13 shows an example of a method for delaying transmission of a BSR according to an embodiment of the present invention.

At step S100, a UE receives a SR configuration from a BS. The SR configuration may be received through system information or an RRC connection reconfiguration message. The SR configuration may include a configuration for a D-SR channel and/or a configuration for a random access procedure.

It is assumed that a BSR is triggered, and the UE is possible for UL transmission. After receiving the SR configuration, at step S110, the UE triggers an SR, and performs an SR procedure according to the SR configuration if the UE does not have allocated radio resources for BSR transmission.

It is assumed that a BSR is triggered again, and the UE is not possible for UL transmission at this time. In this case, even if the UE does not have allocated radio resources for BSR transmission, the UE does not trigger the SR. Therefore, the UE does not perform the SR procedure.

If the UE becomes possible for UL transmission, the UE checks whether the triggered BSR exists. If the triggered BSR exists, at step S120, the UE triggers the SR, performs the SR procedure.

At step S130, the UE receives a UL grant from the BS. At step S140, the UE transmits the triggered BSR to the BS.

Even though FIG. 13 shows an example of a method for delaying transmission of a BSR according to an embodiment of the present invention, it is not limited thereto. That is, according to an embodiment of the present invention, if a UE cannot perform UL transmissions, the UE delaying transmission of a PHR. Even if the UE does not have allocated radio resources for PHR transmission, the UE does not trigger the SR. Therefore, the UE does not perform the SR procedure. If the UE becomes possible for UL transmission, the UE checks whether the triggered PHR exists. If the triggered PHR exists, the UE triggers the SR, performs the SR procedure.

Figure 14:
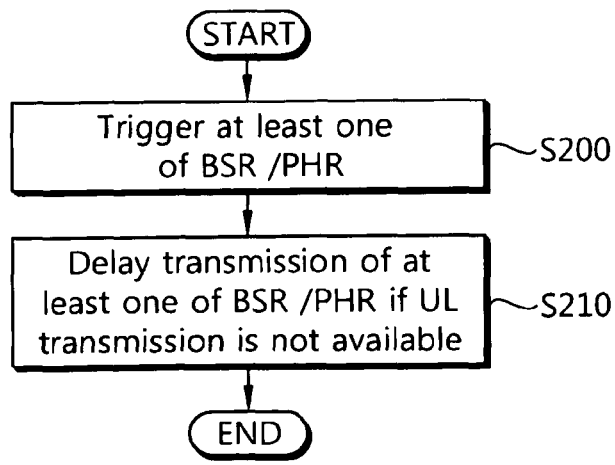
FIG. 14 shows an example of a method for delaying transmission of at least one of BSR/PHR according to an embodiment of the present invention.

FIG. 14 shows an example of a method for delaying transmission of at least one of BSR/PHR according to an embodiment of the present invention.

At step S200, a UE triggers at least one of a BSR and a PHR. At step S210, the UE delays transmission of the at least one of the BSR and the PHR to a base station if UL transmission is not available. When the UE delays transmission of the at least one of the BSR and the PHR, the UE does not trigger an SR. When the UL transmission becomes available, the UE triggers an SR, and transmits the delayed at least one of the BSR and the PHR to the base station.

According to embodiments of the present invention, when a UE cannot perform UL transmissions due to IDC interference within the UE, UL transmissions through a DSR channel when the UE performs an SR procedure, UL transmissions when the UE transmits the BSR through allocated radio resources by the SR procedure, and UL transmissions through additional allocated radio resources by the BSR can be prevented. Accordingly, the IDC interference within the UE can be reduced.

Figure 15:
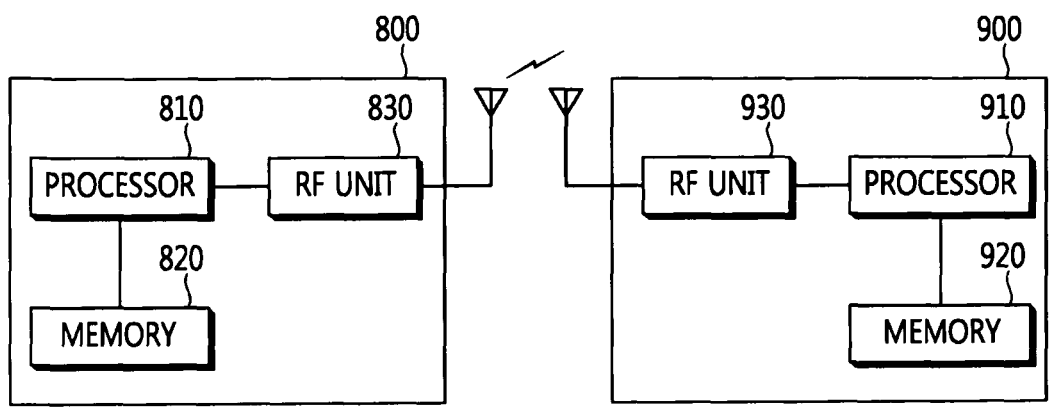
FIG. 15 is a block diagram showing wireless communication system to implement an embodiment of the present invention.

FIG. 15 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for delaying, by a user equipment (UE), transmission of at least one of a buffer status report (BSR) and a power headroom report (PHR) in a wireless communication system, the method comprising:
   triggering at least one of a BSR and a PHR; and
   delaying transmission of the at least one of the BSR and the PHR to a base station if an uplink (UL) transmission is not available,
   wherein the UL transmission is not available when in-device coexistence (IDC) interference occurs within the UE,
   wherein the IDC interference occurs within the UE due to an uplink transmission of the UE interfering with the triggering of the at least one of the BSR and the PHR, and
   wherein the uplink transmission of the UE is at least one of an uplink transmission through a dedicated-scheduling request (D-SR) channel during a scheduling request (SR) procedure, an uplink transmission related to a transmission of the BSR through allocated radio resources by the SR procedure, and an uplink transmission through an additional allocated radio resource by the BSR.

2. The method of claim 1, wherein the delaying the transmission of the at least one of the BSR and the PHR includes not triggering a scheduling request (SR).

3. The method of claim 1, further comprising:
   triggering an SR when the UL transmission becomes available;
   receiving uplink radio resources allocated for transmission of the delayed at least one of the BSR and the PHR from the base station; and
   transmitting the delayed at least one of the BSR and the PHR to the base station using the uplink radio resources.

4. The method of claim 1, further comprising
   receiving an SR configuration from the base station.

5. The method of claim 4, wherein the SR configuration is received through system information or a radio resource control (RRC) connection reconfiguration message.

6. The method of claim 4, wherein the SR configuration includes at least one of a configuration for the dedicated SR (D-SR) channel and a configuration for a random access procedure.

7. A user equipment (UE) in a wireless communication system, the UE comprising:
   a radio frequency (RF) unit configured to transmit or receive a radio signal; and
   a processor coupled to the RF unit and configured to:
      trigger at least one of a buffer status report (BSR) and a power headroom report; and
      delay transmission of the at least one of the BSR and the PHR to a base station if an uplink (UL) transmission is not available,
   wherein the UL transmission is not available when in-device coexistence (IDC) interference occurs within the UE,
   wherein the IDC interference occurs within the UE due to an uplink transmission of the UE interfering with the triggering of the at least one of the BSR and the PHR, and
   wherein the uplink transmission of the UE is at least one of an uplink transmission through a dedicated-scheduling request (D-SR) channel during a scheduling request (SR) procedure, an uplink transmission related to a transmission of the BSR through allocated radio resources by the SR procedure, and an uplink transmission through an additional allocated radio resource by the BSR.

8. The UE of claim 7, wherein the delaying the transmission of the at least one of the BSR and the PHR, the processor is further configured to not trigger a scheduling request (SR).

9. The UE of claim 7, wherein the processor is further configured to:
   trigger the SR when the UL transmission becomes available,
   receive uplink radio resources allocated for transmission of the delayed at least one of the BSR and the PHR from the base station, and
   transmit the delayed at least one of the BSR and the PHR to the base station using the uplink radio resources.

10. The UE of claim 7, wherein the processor is further configured to receive an SR configuration from the base station.

11. The UE of claim 10, wherein the SR configuration is received through system information or a radio resource control (RRC) connection reconfiguration message.

12. The UE of claim 10, wherein the SR configuration includes at least one of a configuration for the dedicated SR (D-SR) channel and a configuration for a random access procedure.

* * * * *